US008509521B2

(12) United States Patent
Keating et al.

(10) Patent No.: US 8,509,521 B2
(45) Date of Patent: Aug. 13, 2013

(54) METHOD AND APPARATUS AND COMPUTER PROGRAM FOR GENERATING A 3 DIMENSIONAL IMAGE FROM A 2 DIMENSIONAL IMAGE

(75) Inventors: Stephen Mark Keating, Reading (GB); Clive Henry Gillard, Alton (GB)

(73) Assignee: Sony Corporation, Tokyo (JP)

( * ) Notice: Subject to any disclaimer, the term of this patent is extended or adjusted under 35 U.S.C. 154(b) by 435 days.

(21) Appl. No.: 12/860,517

(22) Filed: Aug. 20, 2010

(65) Prior Publication Data

US 2011/0129143 A1 Jun. 2, 2011

(30) Foreign Application Priority Data

Nov. 27, 2009 (GB) .................................. 0920877.8

(51) Int. Cl.
*G06K 9/00* (2006.01)
*H04N 13/02* (2006.01)
*H04N 13/00* (2006.01)

(52) U.S. Cl.
CPC .......... *H04N 13/026* (2013.01); *H04N 13/0014* (2013.01); *H04N 2213/002* (2013.01)
USPC ............................................. 382/154; 348/44

(58) Field of Classification Search
None
See application file for complete search history.

(56) References Cited

U.S. PATENT DOCUMENTS

| | | | | |
|---|---|---|---|---|
| 5,850,352 A | * | 12/1998 | Moezzi et al. ................ | 345/419 |
| 7,142,600 B1 | * | 11/2006 | Schonfeld et al. ....... | 375/240.16 |
| 7,511,730 B2 | * | 3/2009 | Kondo et al. .................... | 348/42 |
| 8,086,071 B2 | * | 12/2011 | Chen et al. .................... | 382/284 |
| 2004/0090523 A1 | | 5/2004 | Kondo et al. | |
| 2009/0060321 A1 | * | 3/2009 | Gillard et al. ................ | 382/154 |
| 2009/0066784 A1 | * | 3/2009 | Stone et al. ..................... | 348/47 |
| 2009/0116732 A1 | * | 5/2009 | Zhou et al. .................... | 382/154 |
| 2010/0208942 A1 | * | 8/2010 | Porter et al. .................. | 382/106 |
| 2011/0026809 A1 | * | 2/2011 | Jeong et al. ................... | 382/154 |
| 2011/0032341 A1 | * | 2/2011 | Ignatov et al. ................. | 348/51 |
| 2011/0199372 A1 | * | 8/2011 | Porter et al. .................. | 345/419 |
| 2012/0120192 A1 | * | 5/2012 | Alregib et al. .................. | 348/43 |

FOREIGN PATENT DOCUMENTS

| | | |
|---|---|---|
| WO | WO 97/23097 | 6/1997 |
| WO | WO 99/03068 | 1/1999 |

OTHER PUBLICATIONS

Moustakas et al. (Aug. 2005) "Stereoscopic video generation based on efficient layered structure and motion estimation from a monoscopic image sequence." IEEE Trans. on Circuits and Systems for Video Technology, vol. 15 No. 8, pp. 1065-1073.*
U.S. Appl. No. 13/760,714, filed Feb. 6, 2013, Gillard, et al.

* cited by examiner

*Primary Examiner* — Barry Drennan
(74) *Attorney, Agent, or Firm* — Oblon, Spivak, McClelland, Maier & Neustadt, L.L.P.

(57) ABSTRACT

A method of generating a three dimensional image from a two dimensional image having a background and a first foreground object and a second foreground object. The method includes determining whether the first and second foreground objects occlude, and generating an occluded combination of the first and second object to form a third foreground object when occlusion occurs. The method further includes applying a transformation to the third foreground object, and generating a copy of the third foreground object with the transformation applied thereto. Then, the third foreground object is generated stereoscopically for display based on the transformed third foreground object displaced relative to the copy of the third foreground object.

15 Claims, 16 Drawing Sheets

METHOD AND APPARATUS AND COMPUTER PROGRAM FOR GENERATING A 3 DIMENSIONAL IMAGE FROM A 2 DIMENSIONAL IMAGE

BACKGROUND OF THE INVENTION

1. Field of the Invention

The present invention relates to a method, apparatus and computer program for generating a 3 Dimensional image from a 2 Dimensional image.

2. Description of the Prior art

It is known to generate a 3D binocular image from a single image. It is also known to perform object detection in a 2D image. However, when an object is detected in the 2D image from which the 3D image is to be formed, the movement of the detected object in the image appears un-natural.

It is an aim of the present invention to address this problem.

SUMMARY OF THE INVENTION

According to one aspect of the invention, there is provided a method of generating a three dimensional image from a two dimensional image, the two dimensional image having a background and a first foreground object and a second foreground object located thereon, the method comprising the steps of: applying a transformation to a copy of the background, generating stereoscopically for display the background and the transformed background, generating stereoscopically for display the first and second foreground object located on the stereoscopically displayable background and the transformed background and determining whether the first and second foreground objects occlude with one another, wherein in the event of occlusion, the occluded combination of the first and second object forms a third foreground object and, the method further comprises the step of: applying a transformation to the third foreground object, wherein the transformation applied to the third foreground object is less than or equal to the transformation applied to the background; generating a copy of the third foreground object with the transformation applied thereto and generating stereoscopically for display the third foreground object with the transform applied thereto and the copy of the third foreground object displaced relative to one another by an amount determined in accordance with the position of one of the first or second foreground objects in the image.

This is advantageous because by applying a transform to the third foreground object that is a proportion of that applied to the background image, the effect of a sharp transition that appears un-natural is mitigated.

According to another aspect, there is provided a method of generating a three dimensional image from a two dimensional image, the two dimensional image having a background and a first foreground object and a second foreground object located thereon, the method comprising the steps of: applying a transformation to a copy of the background, generating stereoscopically for display the background and the transformed background, generating stereoscopically for display the first and second foreground object located on the stereoscopically displayable background and the transformed background and determining whether the first and second foreground objects are within a predetermined distance of one another, wherein in the event of the first and second foreground object being within a predetermined distance of one another, the method further comprises the step of: applying a transformation to the first foreground object, wherein the transformation applied to the first foreground object is less than or equal to the transformation applied to the background; generating a copy of the first foreground object with the transformation applied thereto and generating stereoscopically for display the first foreground object with the transform applied thereto and the copy of the first foreground object displaced relative to one another by an amount determined in accordance with the position of the first foreground object in the image.

This is advantageous because the transition is smoothed out as one player occludes with a second player.

The amount of transformation applied to the first and/or second foreground object may increases inversely proportionally to the distance between the first and second foreground object. This again improves the transition.

The method may further comprise determining whether the first and second foreground objects occlude with one another, wherein in the event of occlusion, the occluded combination of the first and second foreground object forms a third foreground object, and the method further comprises the step of applying a transform to the third foreground object wherein the transformation applied to the third foreground object is less than or equal to the transformation applied to the background; generating a copy of the third foreground object with the transformation applied thereto and generating stereoscopically for display the third foreground object with the transform applied thereto and the copy of the third foreground object displaced relative to one another by an amount determined in accordance with the position of the first or second foreground object in the image.

The step of determining whether occlusion has occurred may comprise the step of comparing the length of the detected foreground object in one direction of the image with a threshold length, and determining that occlusion has occurred when the length of the detected foreground object is longer than the threshold length.

The step of determining whether occlusion has occurred may comprise the step of comparing the height of the detected object in the vertical direction of the image with a threshold height, and determining that occlusion has occurred when the height of the detected foreground object is taller than the threshold height.

The degree of transformation applied to the third foreground object may be determined in accordance with difference between the length of the detected foreground object and the threshold length.

The method may comprise storing a copy of the background of the image, and in the event of applying a transformation to the third foreground object, the method further comprises the step of mapping pixels from the background version of the image to corresponding pixel positions vacated by the transformed third foreground object.

This is advantageous because after transformation has taken place, there will be blank space where the foreground image was located prior to transformation. This blank space will be filled by appropriate pixels.

According to another aspect of the invention, there is provided an apparatus for generating a three dimensional image from a two dimensional image, the two dimensional image having a background and a first foreground object and a second foreground object located thereon, the apparatus comprising: a generator for applying a transformation to a copy of the background, a device for generating stereoscopically for display the background and the transformed background, and generating stereoscopically for display the first and second foreground object located on the stereoscopically generated background and the transformed background and, a determiner for determining whether the first foreground object and the second foreground object occlude with one another, wherein in the event of occlusion, the occluded combination of the first and second foreground object form a third foreground object and, the apparatus is operable to apply a transformation to the third foreground object wherein the transform applied to the third foreground object is less than or equal to the transform applied to the background; the generator being further operable to generate a copy of the third foreground object with the transform applied thereto and a device being operable to generate stereoscopically for display the third foreground object with the transform applied thereto and the copy of the third foreground object displaced relative to one another by an amount determined in accordance with the position of one of the first or second foreground object in the image.

The determiner may be further operable to compare the length of the detected foreground object in one direction of the image with a threshold length, and to determine that occlusion has occurred when the length of the detected foreground object is longer than the threshold length.

The determiner may be operable to compare the height of the detected foreground object in the vertical direction of the image with a threshold height, and to determine that occlusion has occurred when the height of the detected foreground object is taller than the threshold height.

The degree of transformation applied may be determined in accordance with difference between the length of the detected object and the threshold length.

The apparatus may further comprise a store operable to store a copy of the background image, and in the event of applying a transform to the third foreground object, a mapping device is further operable to map pixels from the background version of the image to corresponding pixel positions vacated by the transformed third foreground object.

The invention may be embodied as a computer program.

Various other aspects and/or features of embodiments of the invention are provided in the following claims or may be apparent to the skilled person after reading the description.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

An image captured by the camera 20 may be used to generate a modified image so that the captured image and the modified image can be viewed together so as to appear to a user as a three-dimensional image will now be described with reference to FIGS. 1a to 1d and FIGS. 2 to 6.

FIGS. 1a to 1d show examples of a display arrangement for displaying images to a user such that an object may appear to be positioned at a distance from a display. By using appropriate glasses, such as those having differently coloured or polarised lenses for each eye, a user may view displayed images such that images intended for viewing by their left eye and images intended for their right eye are viewed correctly so as to provide a three-dimensional viewing experience for the user.

In order to create an illusion that an object is three-dimensional, an image intended for the left eye may be shifted or displaced with respect to an image intended for the right eye by a displacement amount which depends on the distance between the user and the display, the user's interpupillary distance (IPD), which is the distance between the user's pupils when the user is focussing their eyes at infinity, and a desired distance from the screen at which an object is intended to be positioned. The apparent distance between the user and a rendered object is referred to herein as apparent object depth.

The way in which the offset amount may be calculated is described in detail below with reference to FIGS. 1a to 1d. The offset amount is applied with respect to the image intended for the left eye (the left-hand image), although it will be appreciated that the offset amount could be applied with respect to the right-hand image intended for the right eye.

Figure 1A:
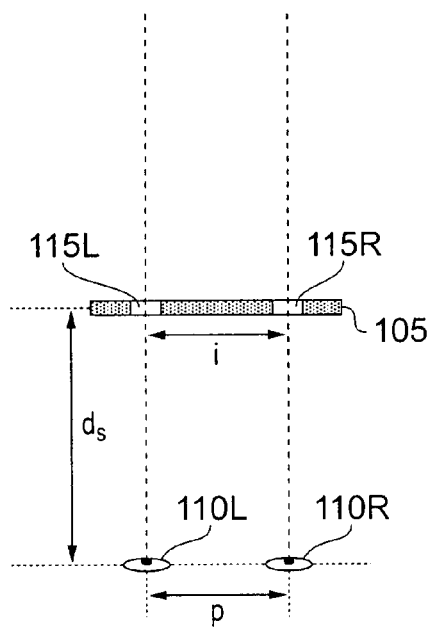
FIGS. 1a to 1d show schematic diagrams of examples of a display arrangement for displaying 3D images to a user such that an object may appear to be positioned at a distance from a display.

FIG. 1a schematically shows a display 105 together with illustrations of a user's left eye 110L and right eye 110R. The distance between the user's eyes and the display 105 is labelled as $d_s$, and the interpupillary distance is labelled as p in FIGS. 1a to 1d. FIG. 1a also illustrates positions on the display at which image features corresponding to an object are to be displayed so as to provide a 3D effect. In particular a left-hand image 115L intended for viewing by the user's left eye 110L, and a right-hand image 115R intended for viewing by the user's right eye 110R are illustrated with respect to the display 105. The offset amount between the left-hand image 115L and the right-hand image 115R is indicated as i in FIGS. 1a to 1d.

Figure 1B:
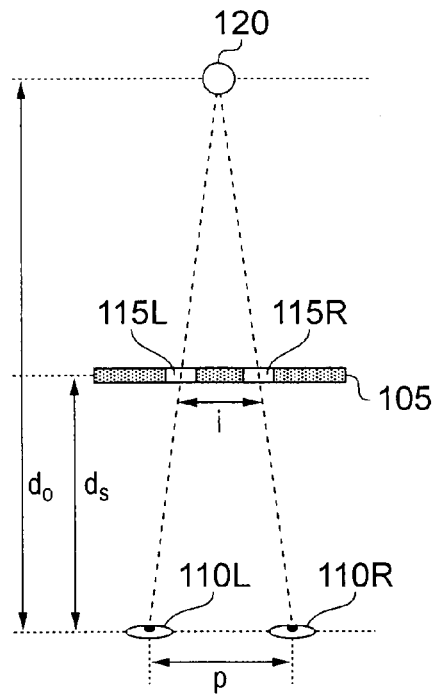

In FIG. 1a, the positions of the left-hand image 115L and the right-hand image 115R are such that the offset amount is the same as the interpupillary distance p (IPD), and therefore the object will appear as if it is at an infinite distance from the display 105, as indicated by the parallel dashed lines in FIG. 1a. However, in order to make the object appear at a finite distance from the display 105, the offset amount should be less than the distance between the user's pupils (interpupillary distance p). This is illustrated in FIG. 1b. Typically, the interpupillary distance is 52 mm to 70 mm although it may vary depending on sex, ethnicity, age, and the like.

FIG. 1b shows a example where the offset amount i is less than the distance p between the user's eyes, and therefore an object 120 will appear as if the object 120 is at a distance $d_O$ from the user's eyes. The offset amount i can be calculated from equation 1 shown below.

$$\left(\frac{d_O - d_S}{d_O}\right) \times p = i \qquad \text{Equation 1}$$

In equation 1, $d_O$ is the apparent object depth, $d_S$ is the distance between the user's eyes 110L 110R and the display 105, p is the distance between the user's pupils (interpupillary distance), and i is the offset amount.

Figure 1C:
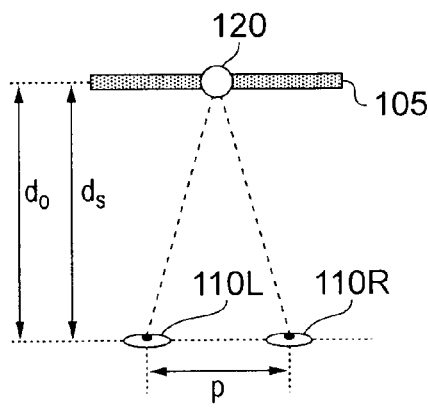

If the object 120 is to appear as if displayed on the display 105 at the position of the display (in other words $d_O = d_S$), then the offset amount i will be zero. This situation is illustrated in FIG. 1c.

Figure 1D:
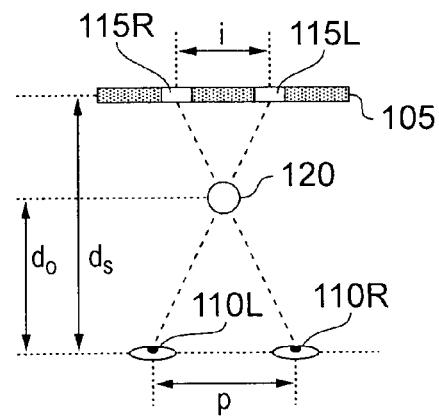

If the object is to appear as if positioned between the display 105 and the user (in other words $d_O < d_S$), then the offset amount with respect to the left-hand image 115L should be negative, as illustrated in FIG. 1d. In other words, the right-hand image 115R would appear to the user to be to the left of the left-hand image 115L, thus causing the user's eyes to converge and focus at a position between the user and the display 105.

In embodiments, to reduce discomfort and eye fatigue for the user, the offset amount should be the same as, or less than, the interpupillary distance ($i \leq P$). Additionally, to reduce eye fatigue and discomfort for the user, the ratio of the apparent distance to the object $d_O$ with respect to the distance to the display $d_S$ should be greater than a predetermined amount, typically 0.2. In other words, in some embodiments, $d_O/d_S \geq 0.2$, so as to try to reduce eye discomfort for the user. However, it will be appreciated that other suitable values could be used.

A distance between a camera and an object within an image captured by the camera is used to determine the offset amount and will now be described with reference to FIGS. 2 to 6.

Figure 2:
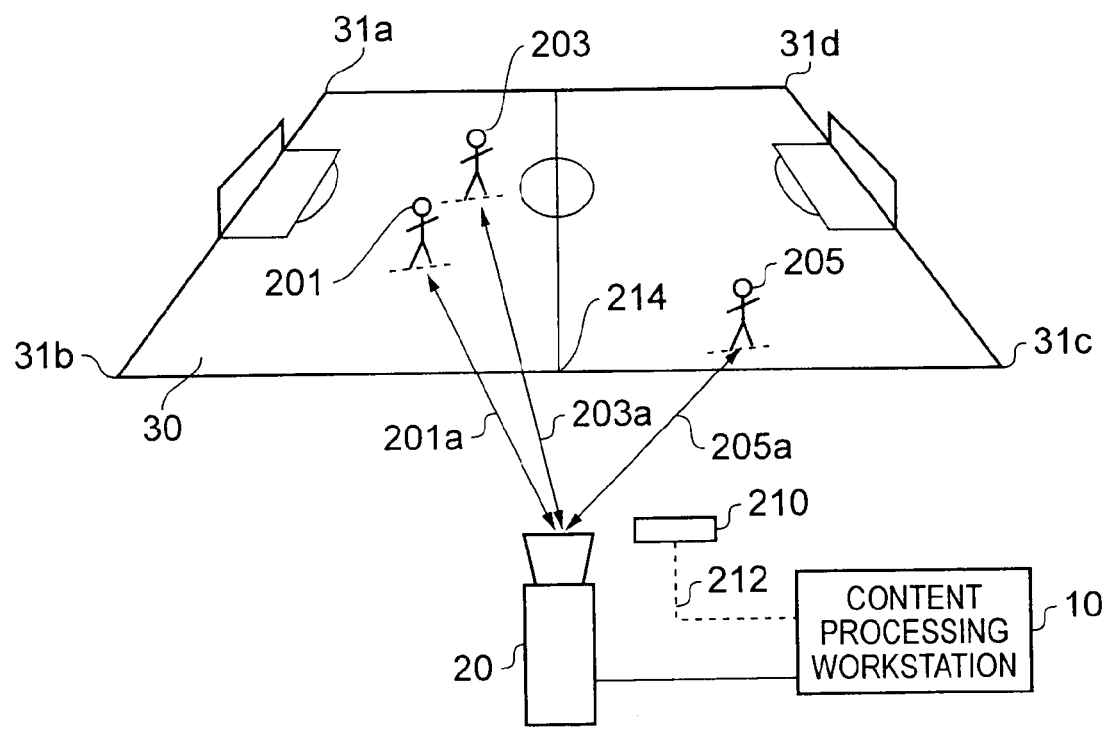
FIG. 2 is a schematic diagram of a system for determining the distance between a camera and objects within a field of view of the camera.

FIG. 2 is a schematic diagram of a system for determining the distance between a position of the camera and objects within a field of view of the camera.

The system shown in FIG. 2 is similar to the one described in FIG. 1 of GB 2452508A. In particular, FIG. 2 shows the content processing workstation arranged to communicate with the camera 20, which captures images of the pitch 30. As described above, the content processing workstation 10 is operable to analyse the images captured by the camera 20 so as to track players on the pitch 30, and determine their position on the pitch 30. In some embodiments, the system comprises a distance detector 210 operable to detect a distance between the camera 20 and objects within the field of view of the camera. The distance detector 210 and its operation will described in more detail later below.

The content processing workstation can use the tracking data and position data to determine a distance between a position of the camera 20 and players on the pitch. For example, the content processing workstation can analyse the captured image so as to determine a distance 201a between a position of the camera 20 and a player 201, a distance 203a between the position of the camera 20 and a player 203, and a distance 205a between the position of the camera 20 and a player 205.

In other words, the distance between the object within the scene and a reference position defined with respect to the camera is determined. The reference position is located at the position of the camera.

Additionally, the workstation 10 is operable to detect predetermined image features within the captured image which correspond to known feature points within the scene. For example, the workstation can analyse the captured image using known techniques so as to detect image features which correspond to features of the football pitch such as corners, centre spot, penalty area and the like. Based on the detected positions of the detected known feature points (image features), the workstation 10 can then map the three dimensional model of the pitch 30 to the captured image using known techniques. Accordingly, the workstation 10 can then analyse the captured image to detect the distance between the camera and the player in dependence upon the detected position of the player with respect to the 3D model which has been mapped to the captured image.

The content processing workstation 10 can analyse the captured images so as to determine a position at which the player's feet are in contact with the pitch. In other words, the workstation 10 can determine an intersection point at which an object, such as a player, coincides with a planar surface such as the pitch 30.

Where an object is detected as coinciding with the planar surface at more than one intersection point (for example both of the player's feet are in contact with the pitch 30), then the workstation 10 is operable to detect which intersection point is closest to the camera 20 and use that distance for generating the offset amount. Alternatively, an average distance of all detected intersection points for that object can be calculated and used when generating the offset amount. However, it will be appreciated that other suitable intersection points could be selected, such as an intersection point furthest from the camera 20.

However, in some situations, the method of determining the distance between position of the camera 20 and the object within the scene as described above may cause distortions in the appearance of the three-dimensional image. Such distortions may be particularly apparent if the image is captured by a very wide angle camera or formed by stitching together images captured by two high definition cameras such as the camera 22.1 and the camera 22.2.

For example, image distortions in the three-dimensional image may occur if the pitch 30 is to be displayed as three-dimensional images upon which the players and the ball are superimposed. In this case, corners 31b and 31c will appear further away than a centre point 214 on the sideline closest to the camera 20. The sideline may thus appear curved, even though the sideline is straight in the captured image.

This effect can be particularly apparent when the three-dimensional image is viewed on a relatively small display such as a computer monitor. If the three-dimensional image is viewed on a comparatively large screen such as a cinema screen, this effect is less obvious because the corners 31b and 31c are more likely to be in the viewer's peripheral vision. The way in which the pitch may be displayed as a three-dimensional image will be described in more detail later below.

A possible way to address this problem would be to generate an appropriate offset amount for each part of the image so as to compensate for the distortion. However, this can be computationally intensive, as well as being dependent on several physical parameters such as degree of distortion due to wide angle image, display size and the like.

Therefore, to reduce distortion in the three-dimensional image and to try to ensure that the front of the pitch (i.e. the sideline closest to the camera) appears at a constant depth from the display, especially when the three-dimensional image is to be viewed on a relatively small display such as a computer monitor or television screen, embodiments of the invention determine the distance between the object and a reference position which lies on a reference line. The reference line is orthogonal to the optical axis of the camera and passes through a position of the camera, and the reference position is located on the reference line at a point where an object location line and the reference line intersect. The object location line is orthogonal to the reference line and passes through the object. This will be described below with reference to FIG. 3.

Figure 3:
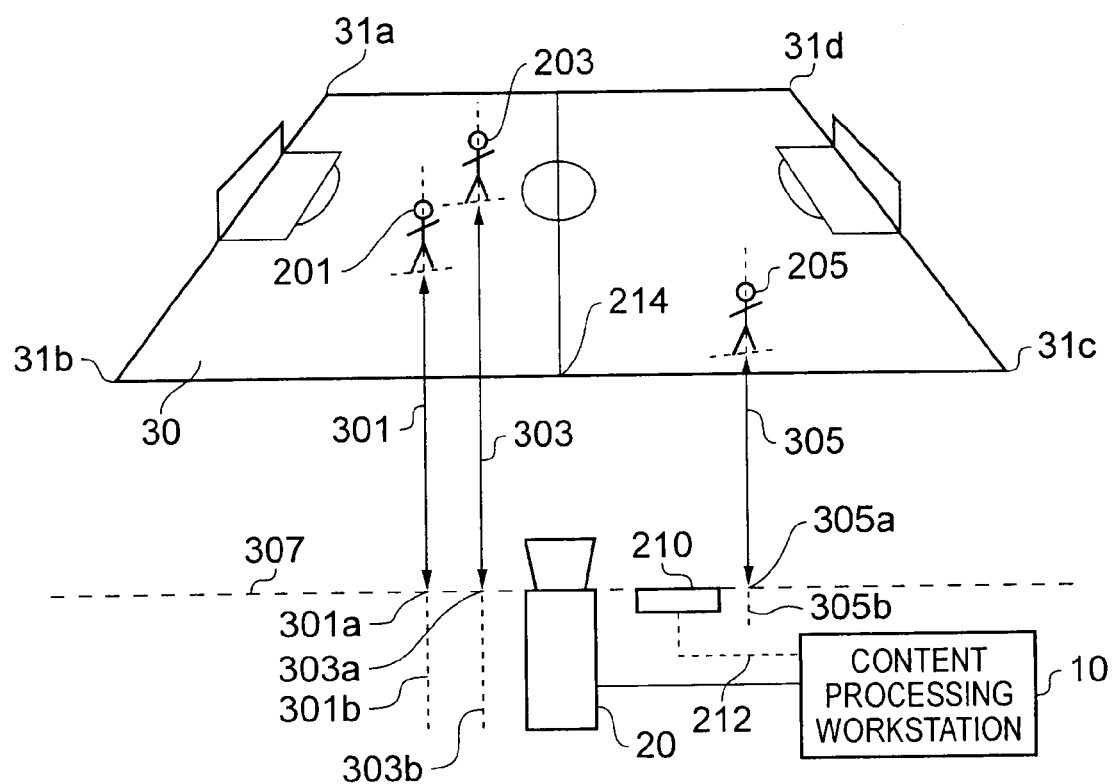
FIG. 3 is a schematic diagram of a system for determining the distance between a camera and objects within a field of view of the camera.

FIG. 3 is a schematic diagram of a system for determining the distance between a camera and objects within a field of view of the camera in accordance with embodiments of the present invention. The embodiment shown in FIG. 3 is substantially the same as that described above with reference to FIG. 2. However, in the embodiments shown in FIG. 3, the workstation is operable to determine a distance between an object and a reference line indicated by the dashed line 307.

As shown in FIG. 3, the reference line 307 is orthogonal to the optical axis of the camera (i.e. at right angles to the optical axis) and passes through the position of the camera. Additionally, FIG. 3 shows reference positions 301a, 303a, and 305a which lie on the reference line 307.

For example, the workstation is operable to determine a distance 301 between the reference position 301a and the player 201. The reference position 301a is located on the reference line 307 where an object reference line (indicated by dotted line 301b) for player 201 intersects the reference line 307. Similarly, the reference position 303a is located on the reference line 307 where an object reference line (indicated by dotted line 303b) for player 203 intersects the reference line 307, and the reference position 305a is located on the reference line 307 where an object reference line (indicated by dotted line 305b) intersects the reference line 307. The object reference lines 301b, 303b, and 305b are orthogonal to the reference line 307 and pass through players 201, 203 and 205 respectively.

In some embodiments, the reference line 307 is parallel to the sideline which joins corners 31b and 31c so that, when a captured image of the pitch and a modified image of the pitch are viewed together on a display in a suitable manner, all points on the side line joining corners 31b and 31c appear as if at a constant distance (depth) from the display. This improves the appearance of the three-dimensional image without having to generate an offset amount which compensates for any distortion which may arise when the image is captured using a wide angle camera or from a composite image formed by combining images captured by two or more cameras. However, it will be appreciated that the reference line need not be parallel to the sideline, and could be parallel to any other appropriate feature within the scene, or arranged with respect to any other appropriate feature within the scene.

In order for images to be generated such that, when viewed, they appear to be three-dimensional, the content processing workstation 10 is operable to detect a position of an object such as a player within the captured image. The way in which objects are detected within the image by the content processing workstation 10 is described in GB 2452508 A. The workstation 10 can then generate a modified image from the captured image by displacing the position of the object within the captured image by the offset amount so that, when the modified image and the captured image are viewed together as a pair of images on the display 105, the object appears to be positioned at a predetermined distance from the display. The way in which the modified image and the captured image may be displayed together is illustrated in FIG. 4.

Figure 4:
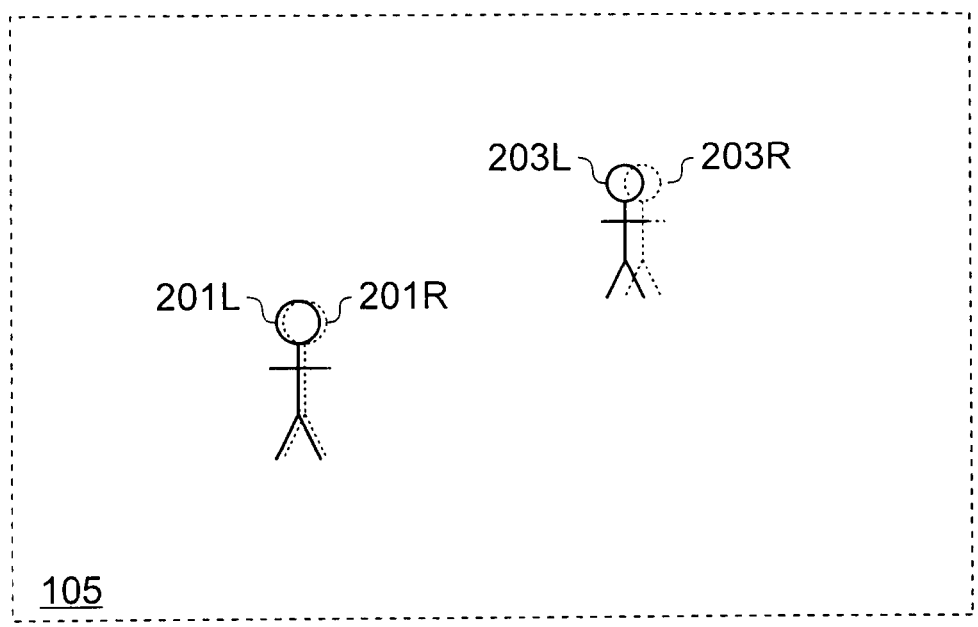
FIG. 4 shows a system for displaying images so that the images can be viewed as three dimensional images by a user.

FIG. 4 shows a system for displaying images in accordance with embodiments of the present invention so that the images can be viewed as three dimensional images by a user.

In particular, FIG. 4 shows images of the player 201 and the player 203 on the display 105. The image captured by the camera 20 is used to display a left-hand image 201L corresponding to the player 201 as well as a left-hand image 203L of the player 203. The left-hand images are intended to be viewed by a user's left eye, for example by the user wearing a suitable pair of polarised glasses. The workstation 10 is operable to generate a modified image from the captured image so as to generate respective right-hand image comprising each object. FIG. 4 shows a right-hand image 201R (indicated by the dashed line) corresponding to the player 201, and a right-hand image 203R (indicated by the dashed line) corresponding to the player 203. For example, when the left-hand image 201L is viewed together with the right-hand image 201R on the display 105, the player 201 will appear as if positioned at a predetermined distance from the display 105.

In order to generate the modified image from the left hand image (i.e. generate the right-hand image from the left-hand image) the workstation 10 is operable to generate a mask which corresponds to an outline of the object, such as the player. This is described above with reference to the step S40 of GB 2452508A. The content processing workstation 10 is then operable to apply the offset amount image offset to pixels within the mask, so as to generate the modified image (right-hand image). This may be carried out in respect of each object which is detected within the captured image.

The offset amount for each player is dependent upon the distance between the camera and the player. For example, as shown in FIG. 2, player 201 is closer to the camera than player 203. Therefore, according to equation 1 above, for a given distance ($d_S$) between the screen and the user, the offset amount between the left-hand image 201L and the right-hand image 201R corresponding to player 201 will be smaller than the offset amount between the left-hand image 203L and the right-hand-image 203R corresponding to player 203. The apparent distance of each object can be scaled appropriately as desired, for example, so as to be displayed on a particular size of display.

It will be appreciated that in some circumstances, for example with football players on a football pitch, it may be undesirable to cause a player to appear in three dimensions at a distance from the display 105 which corresponds to the actual distance from the camera 20, as this may cause an unpleasant viewing experience for a user. Additionally, this may lose some of the three-dimensional effect if an object is rendered so as to appear tens of metres from the display. Therefore, in embodiments of the invention, the workstation 10 is operable to detect what percentage of the captured image in the vertical direction is occupied by the football pitch and scale the apparent object depth accordingly.

For example, the workstation 10 can detect a position of a sideline of the football pitch 30 which is closest to the camera 20, as well as detecting a position of a sideline of the football pitch 30 which is furthest from the camera 20, based on the mapping of the 3D model to the captured image. The workstation 10 then generates the offset amount accordingly so that objects which are at the same distance from the camera as the nearest sideline appear as if at the same distance from the user as the display.

The distance at which the farthest sideline appears from the display can then be set by the workstation 10 to be a distance corresponding to a vertical height of the display 705. However, it will be appreciated that any other suitable method of scaling the apparent object depth may be used.

Additionally, it will be appreciated that it is the physical distance between the right-hand image and the left-hand image on the display which causes the object to appear as if at a predetermined distance from the display. Therefore, in embodiments of the invention, the offset amount is initially calculated in physical units of measurement, such as millimetres. When generating the modified image for rendering as pixels on the display 105, the value of the offset amount in millimetres is scaled by the workstation 10 in dependence on any or all of: the size of display 105; the resolution of the display in pixels; and pixel pitch. These parameters may be stored in a look-up table which stores the relevant parameters for different types of display (e.g. by manufacturer and model number), or they may be input by a user.

In some embodiments, the content processing workstation 10 may cause the display 105 to display a calibration sequence of images which allows a user to provide feedback via a suitable input means as to whether, for example, an object appears at infinity, at the screen distance, and distances in between infinity and the user. However, it will be appreciated that other suitable methods of scaling the right-hand and left-hand images for output on a display may be used.

As described above, in some embodiments, the distance between the camera and the intersection point associated with an object may be determined by the workstation 10. Accordingly, in some embodiments, the offset amount may be generated in dependence upon the distance between the camera and the intersection point for that object and applied as the offset amount for the whole of that object. In other words, a player would appear two-dimensional but would appear as if positioned in three dimensions on the football pitch at a predetermined distance from the display. This advantageously reduces processing resources as the distance to each point on a player corresponding to an output pixel on the display does not have to be detected and used to generate a respective offset amount. Furthermore, this addresses a problem that such distance data may not be available from the tracking and position data generated as described above.

In some embodiments, the workstation 10 is operable to map a three-dimensional model of a stadium comprising the football pitch 30 to the captured image so that the workstation 10 can generate an appropriate offset amount for each pixel in the captured image corresponding to the stadium so as to cause the stadium and/or pitch 30 to appear as a three-dimensional image when viewed on the display 105. As the stadium and pitch are relatively static with respect to the camera 20, generation of the respective offset amounts for each pixel in the captured image may be carried out when the background image is generated, or it may be carried out periodically, so as to reduce processing resources.

In order to reduce the likelihood that undesirable image artefacts may occur in the modified image when the right-hand image (modified image) is combined with the background image, in some embodiments, the workstation 10 is operable to generate a background image of the pitch 30 as described above with reference to GB 2452508A for each captured frame. This allows adjustment of the background image in accordance any change in lighting or shadows on the pitch 30. However, it will be appreciated that the background image may be generated and updated at any other suitable frame interval, for example, every other frame.

The workstation is operable to map the three-dimensional model of the pitch to the captured image and generate an appropriate offset amount for each pixel corresponding to the pitch as described above so as to generate a modified background image. The workstation can then combine the modified right-hand image corresponding to an object such as a player with the modified background image so as to generate a combined modified image. For example, the workstation 10 can generate the combined modified image by superimposing the modified image corresponding to an object on the modified background image. When the captured image and the combined modified image are viewed together on a display in a suitable manner, they will appear to the user as if they are a three-dimensional image.

As mentioned above, the tracking data indicates where on the pitch a particular player is. This allows the workstation 10 to generate an offset amount for that player so as to cause them to appear at a three-dimensional position on the pitch when the left-hand and right hand images are displayed together on the display as a pair of images. However, if there is an ambiguity as to which track belongs to which player, or the position of the player cannot be determined by the tracking algorithm for whatever reason, the simulated 3D appearance may be lost or degraded.

Accordingly, in some embodiments of the invention, the system comprises a distance detector 210. The distance detector 210 may be coupled to the camera 20 or it may be separate to the camera 20. The distance detector is operable to generate distance data indicative of the distance between the camera 20 and an object such as a player on the pitch 30. The distance detector 210 is operable to send the distance data to the workstation 10 via a suitable communication link, as indicated by dashed line 212 in FIG. 2. The content processing workstation 10 is then operable to determine the distance between the camera and the object in dependence upon the distance data received from the distance detector 210. In other words, the distance detector 210 acts as a distance sensor. Such sensors are known in the art and may use infrared light, ultrasound, laser light and the like to detect distance to objects. The distance detector is operable to generate a distance map data which indicates, for each pixel of the captured image, a respective distance between the camera and a scene feature within the scene which coincides with that pixel. The distance data sent from the distance detector 210 to the workstation 10 can then comprise the distance map data.

To achieve this functionality, the distance detector may comprise an infrared light source which emits a pulse of infrared light. The camera 20 can then detect the intensity of the infrared light reflected from objects within the field of view of the camera at predetermined time intervals (typically of the order of nano-seconds) so as to generate a grey scale image indicative of the distance of objects from the camera. In other words, the grey scale image can be thought of as a distance map which is generated from detecting the time of flight of the infrared light from the source to the camera.

To simplify design, the camera can comprise a distance detector in the form of an infrared light source. Such cameras are known in the art such as the "Z-Cam" manufactured by 3DV Systems. However, it will be appreciated that other known methods of generating 3D depth maps could be used, such as infrared pattern distortion detection.

It will be appreciated that any other suitable distance detector could be used. For example, a camera having an optical axis which is perpendicular to the optical axis of the camera 20 may be used to capture images of the pitch. These further captured images may be analysed by the workstation 10 to detect and track the player positions and the resultant data correlated with the image data from the camera 20 so as to triangulate the position of the players more accurately.

In some embodiments, the workstation 10 is operable to use the distance detector 210 to detect and track other objects in the field of view of the camera 20, such as a football, although it will be appreciated that any other suitable object could be detected. For example, images captured by one or more additional cameras may be analysed by the workstation 10 and combined with data from the tracking system so as to track the football and generate appropriate left-hand and right-hand images accordingly.

To generate the modified image, the workstation 10 is operable to detect object pixels within the captured image which correspond to the object within the scene. In the embodiments described above, the object pixels correspond to those pixels of the player mask used to generate the modified image as described above. The workstation can then determine the distance between the camera and the player using the distance data which is associated with the pixels of the player mask in the distance map data. To simplify three dimensional display, a mean average of distance values in the distance map data which correspond to the pixels of the player mask may be used to generate the offset amount as described above. However, it will be appreciated that any other suitable method of selecting a distance value from the distance map data corresponding to an object could be used.

In other embodiments, the workstation is operable to generate an offset amount to apply between the left-hand image and the right-hand image for each pixel in the depth map data. Consequently, when the left-hand image and the right-hand image are viewed together as a pair of images on the display as described above, the objects may have an improved three-dimensional appearance because surface dimensionality of objects may be more accurately reproduced rather than displaying the object as if it were a two dimensional image at some distance from the display.

However, over distances of tens of meters, which are typically involved when filming sports on sports pitches, such 3D camera systems may lack the depth resolution needed to be able to generate an offset amount for each pixel corresponding to a detected object within a captured image so as to present an effective three-dimensional appearance to a user. Therefore, the embodiments described above in which the offset amount is generated in dependence upon distance data in the depth map data are more applicable to situations in which relevant objects within a scene are within a few metres of the camera. In the context of sports footage, such sports may be boxing, snooker, table tennis, tiddlywinks, gymnastics, fencing and the like, although it will be appreciated that, subject to sufficient depth resolution, other events or scenes could also be captured.

In some embodiments, the distance data from the depth map may be combined with the tracking and position data so as to improve accuracy when determining the position of the player on the pitch and hence the distance between the camera and the player.

When the above described embodiments are used to capture images of players on a football pitch, a possible problem may arise if players are all within the same area on the pitch, for example during a corner, free kick, or during a tackle. In this case, when a 3D image is reproduced on the display, the 3D appearance to a user may become muddled or unclear due to occlusion of one player by another player.

Accordingly, in embodiments of the present invention, the workstation 10 is operable to detect whether any of the players are within a threshold distance of each other within the captured image. Those players within the threshold distance of each other are then designated as belonging to a group of players. Using techniques as described above, the workstation is operable to determine the respective distance between the camera and each of the players so as to generate an average distance value indicative of the average distance between the camera and each of the of players in the group. Of course, any distance value may be used such as finding the distance value closest to the camera (which may be the lowest object in the image). The content processing workstation 10 is then operable to generate an offset amount, applicable to those players within the group, in dependence upon the average distance value in a similar way to that described above with reference to FIGS. 2 to 4. The workstation 10 is then operable to generate the right hand-image by displacing, with respect to the detected positions of the players within the group, each player by the offset amount for that group.

Figure 5:
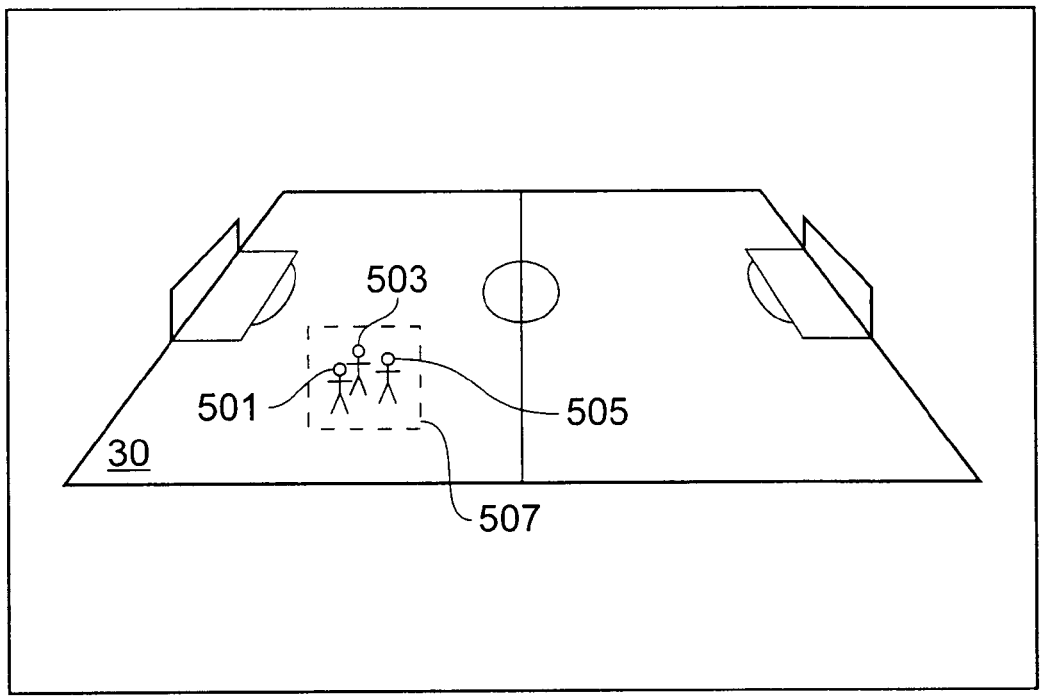
FIG. 5 shows a schematic diagram of a group of players on the pitch.

This is illustrated in FIG. 5, which shows a schematic diagram of a group of players on the pitch. In particular, FIG. 5 illustrates players 501, 503, and 505 on the pitch 30. As mentioned above, the workstation 10 is operable to detect whether the players are within a threshold distance of each other. In the example shown in FIG. 5, the players 501, 503, and 505 are within the threshold distance of each other and are thus designated as belonging to a group of players (as indicated by the dashed line 507).

The workstation 10 is operable to determine the distance between each of the players in the group 507 as described above and generate an average distance value for the players in that group. The offset amount is then generated by the workstation 10 in dependence upon the average distance value and applied as the image offset amount i for each player 501, 503, and 505 in the group 507. When the resultant left-hand and right-hand images are displayed together as a 3D image, all three players in the group will then appear at the same distance from the display 105. This simplifies 3D display, thus reducing eye fatigue for a user, especially if there is a large amount of fast game action as may frequently happen during a football match.

Figure 6:
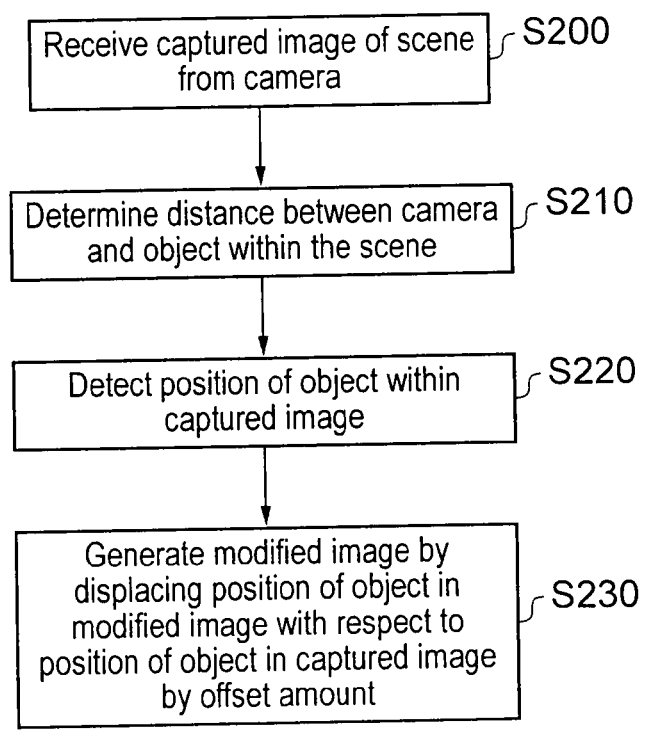
FIG. 6 shows a flowchart of an image processing method.

An image processing method in accordance with embodiments of the present invention will now be described with reference to FIG. 6.

At a step S200, the content processing workstation 10 receives a captured image of a scene, such as an image of a football match, from the camera 20. Then, at a step S210, the workstation 10 determines the distance between the camera and an object within the scene, such as player. The determination may be based on the position and tracking data, generated from the distance data, generated from the depth map data, or from a combination of any or all of these data, using the techniques described above.

At a step S220, the workstation 10 detects a position of the object within the captured image using the techniques described above. For example, in embodiments, the workstation can generate a player mask for each player and use the player masks when generating the modified image (right-hand image).

Then, at a step S230, the workstation 10 generates the modified image (right-hand image) by displacing the position of the object within the modified image by the offset amount. As described above, the offset amount is derived from the distance between the camera and the object. When the captured image (left-hand image) and the modified image (right-hand image) are viewed together as a pair of images on a display, the object will appear to be positioned at a predetermined distance from the display. This advantageously allows so-called 3D images to be generated without the need for expensive stereo pairs of cameras or time consuming post-processing operations.

As already noted, the 3 Dimensional image in the above system is created using only one captured image, modifying this captured image and then viewing both images together. In order for the user to perceive the touchline nearest the camera as being in the plane of the display and the touchline farthest from the camera as being behind the screen, the captured image of the pitch is also modified. For each vertical position on the screen (i.e. for each pixel position in the vertical direction of the screen) the captured image of the pitch is modified by applying a horizontal transformation to the pixel. The amount of horizontal transformation (or displacement relative to the captured image) for each vertical pixel position is determined by the distance of the real-life position of the pixel from the camera. In particular, the amount of transformation required is provided by Equation 1. As the skilled person will understand, Equation 1 provides a distance transformation whereas the number of pixels positions will need to be calculated. The number of pixels transformed will be thus determined also in accordance with the number of pixels per centimeter of the display. The transformation applied to the pitch and/or players will be hereinafter referred to as "shear". However, as the skilled person will appreciate, any type of transformation may be implemented in embodiments of the invention to create the modified image. Examples of such transformation include the horizontal shear, but also include a mapping in general. The invention is not limited to these examples.

Also, the horizontal position of the pixel could also be used to determine the horizontal displacement required. However, due to the use of a reference line as noted in FIG. 3 to reduce computational expense, the depth of each horizontal pixel position at any vertical pixel position is assumed to be constant. The depth information is obtained from the depth map.

Figure 7A:
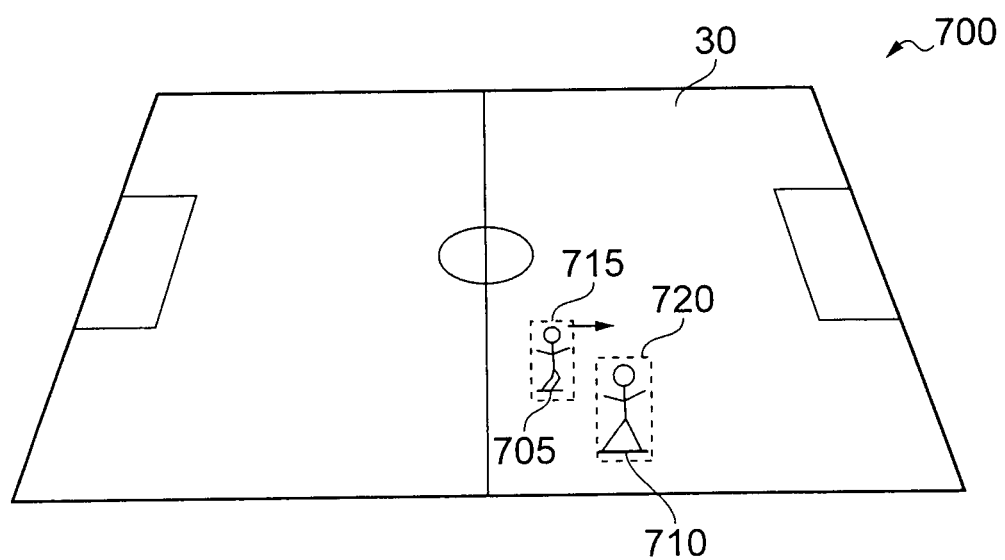
FIGS. 7a to 7c shows a representative image showing the segmenting of players on the pitch.

FIG. 7 shows a representative screenshot of a football pitch 700 with two different players 705 and 710 located thereon. The first player 705 is located within a first segment 715 and the second player 710 is located within a second segment 720. The first player 705 is running behind the second player 710 in the direction shown by the arrow in FIG. 7A. The position of the first player 705 and the second player 710 on the pitch is determined as explained above. In particular, the workstation 10 determines the intersection point at which the player intersects with the pitch. This intersection point is used to determine the offset required to provide the correct 3D image.

Figure 7B:
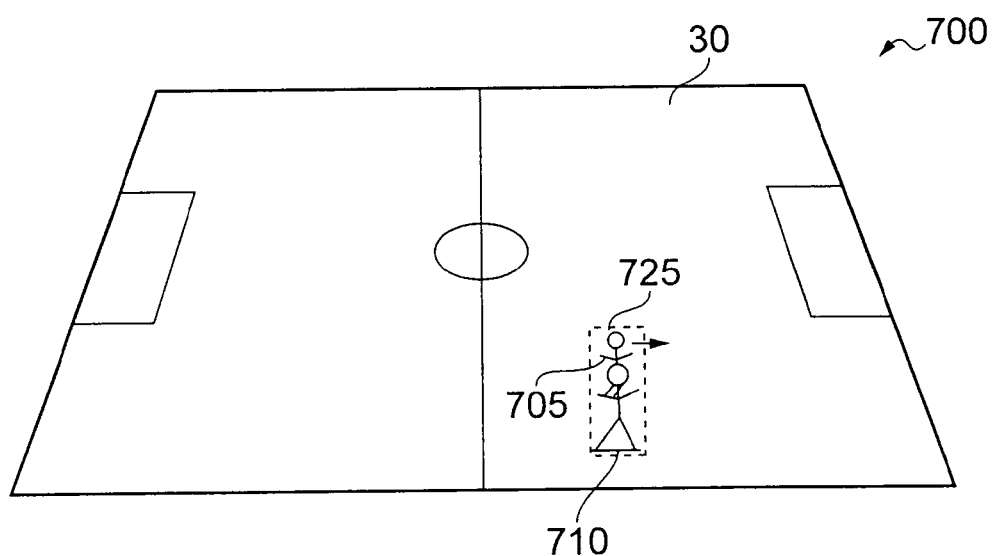

Referring to FIG. 7B, as the first player 705 runs behind the second player 710, occlusion occurs. So, when the first player 705 runs behind the second player 710, the camera sees the first and second player 705 and 710 as one object to be detected. This causes a problem.

The position of the first player 705 and second player 710 is determined to be at the position of the detected object (rather than the individual positions of the first and second player). In other words, as in embodiments the position of the detected object is determined as the point closest to the camera in the detected object, the position of the first player 705 on the pitch will be incorrectly determined. This is particularly important because the position of the players on the pitch is used to determine the amount of separation between the captured left image and the generated right image. As the determined position of the first player 705 shifts to be much nearer the camera, the separation between the left and right images change quite dramatically. This makes the image appear to move sharply.

Figure 7C:
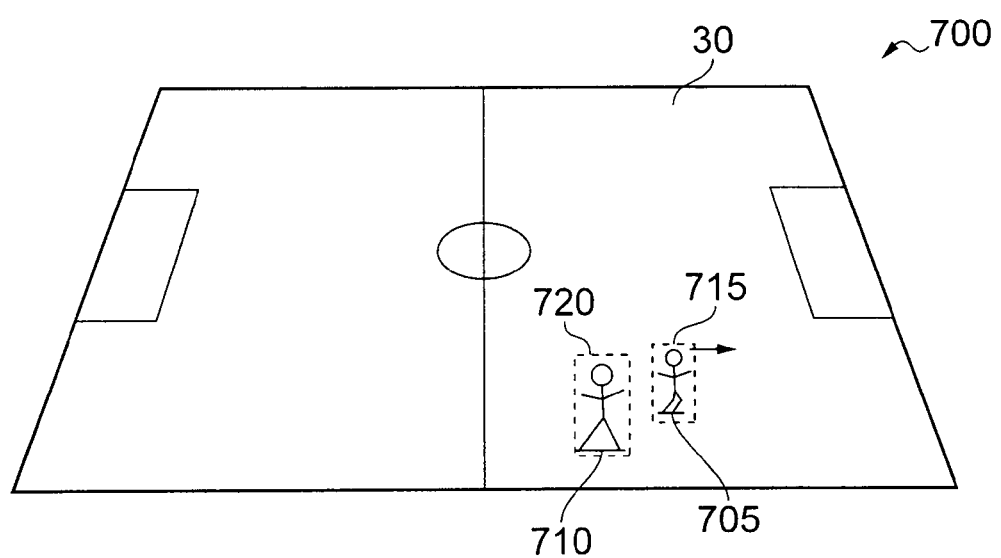

As shown in FIG. 7C, the first player 705 has continued his run such that the first player 705 and the second player 710 are now located within the first segment 715 and the second segment 720 respectively. Accordingly, the position of the first player 705 and the second player 710 is corrected. This means that as the determined position of the first player 705 shifts back to the correct position. In other words, the determined position of the first player moves to be further from the camera. Therefore, the separation between the left and right images changes again quite dramatically. The rapid change of position of the first player 705 causes the 3D image to change quite dramatically. This causes an unpleasant viewing experience. Embodiments of the present invention aim to address this problem.

Figure 8A:
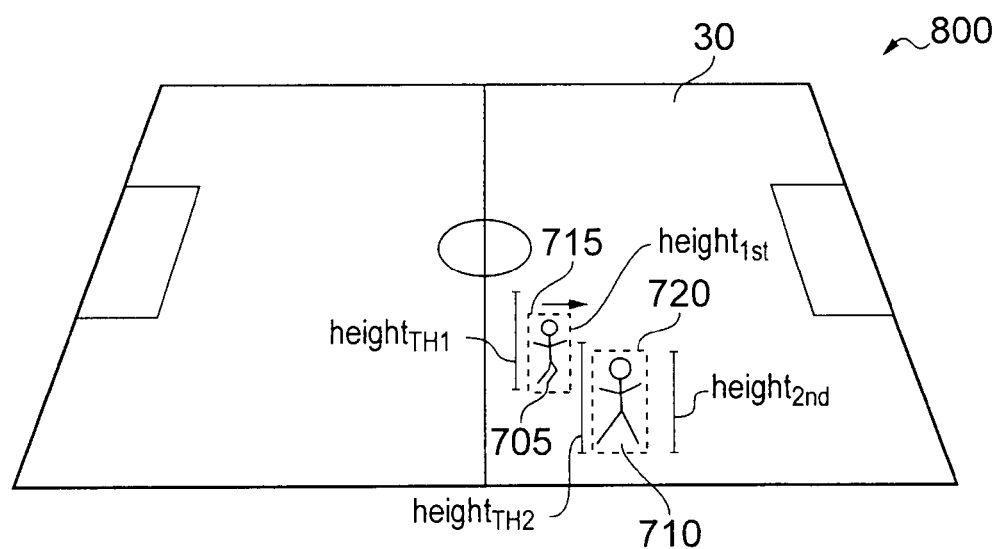
FIGS. 8a to 8d shows a representative image showing the segmenting of players with correction applied according to embodiments of the present invention.

Referring to FIG. 8A, an embodiment of the present invention is discussed. The first player 705 and the second player 710 are detected and the positions of the first player 705 and the second player 710 are determined as in FIG. 7A. The vertical height, $height_{1st}$ of the first segment 715 and the vertical height, $height_{2nd}$ of the second segment 720 are also determined. This is achieved by counting the number of vertical pixels in the segment. Alternatively, the number of pixels in the vertical direction (i.e. orthogonal to the plane of the pitch) of the mask of the player generated in FIG. 2 may be counted instead.

The vertical height of the first segment 715 and the vertical height of the second segment 720 are compared to a threshold height, $height_{TH1}$ and $height_{TH2}$ respectively. The threshold height will be discussed later. As can be seen from FIG. 8A, the vertical height $height_{1st}$ of the first segment 715 is less than the corresponding threshold height $height_{TH1}$ for the position of the first player 705 on the pitch. Similarly, the vertical height $height_{2nd}$ of the second segment 720 is less than the threshold height $height_{TH2}$ for the position of the second player 710 on the pitch. The content processing workstation 10 applies the correct amount of offset to the pixels within the mask and generates the modified image (right-hand image) as discussed in FIG. 4 above. It should be noted here that there is no horizontal shear applied to the first player 705 and the second player 710. This is because the first player 705 and the second player 710 are located at the respective positions and so have a single depth value. This gives the impression to the user that the first player 705 and the second player 710 are stood upright in the image.

Figure 8B:
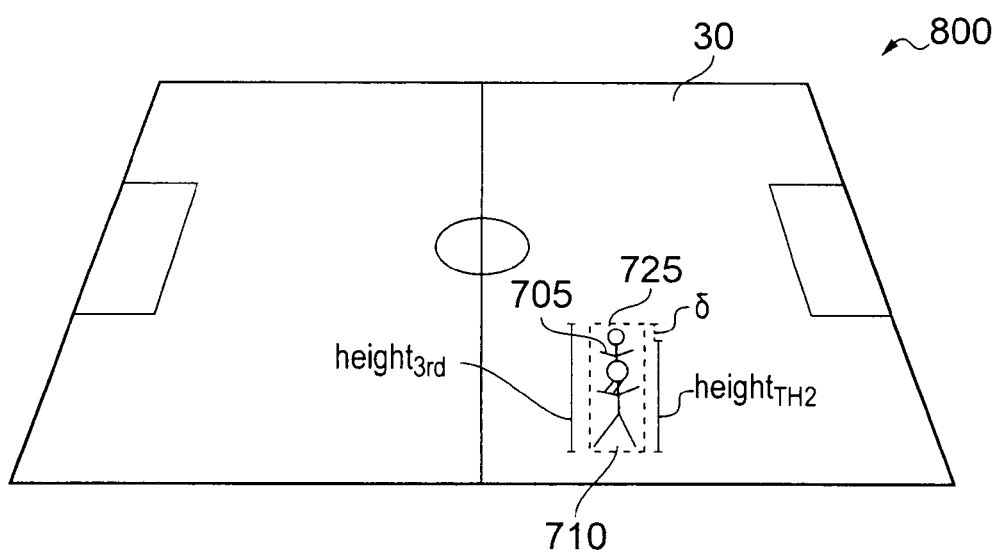

Referring to FIG. 8B, the first player 705 has run behind the second player 710. As noted before, the detection algorithm detects the first player 705 and the second player 710 as being a single player. A third segment 725 is generated whose position is determined to be the position of the occluded player. In other words, the first and second player overlapping will be detected as a single player with the position of the combination being deemed to be the position of the second player 710. The vertical height of the third segment 725 is compared with the threshold height corresponding to the position of the third segment 725. As can be seen from FIG. 8B, the vertical height of the third segment 725 $height_{3rd}$ is greater than the threshold height corresponding to the position of the third segment 725. In particular, the vertical height of the third segment 725 $height_{3rd}$ is δ pixels greater than the threshold height corresponding to the position of the third segment 725. As the threshold height is exceeded, the workstation 10 determines that the third segment 725 contains two or more players that occlude.

In order to address the problems noted above, the third segment 725 (and the contents located therein) has a proportion of horizontal shear applied thereto. In other words, a small proportion of the transformation such as horizontal shear that is applied to the pitch is also applied to the contents of the third segment 725. This means that the transformed third segment 725' rather than appearing upright appears to lean slightly into the pitch. This reduces the impact of the first player 705 appearing to jump forward and then jump back again as noted above when the position of the first player 705 is incorrectly determined.

Figure 8C:
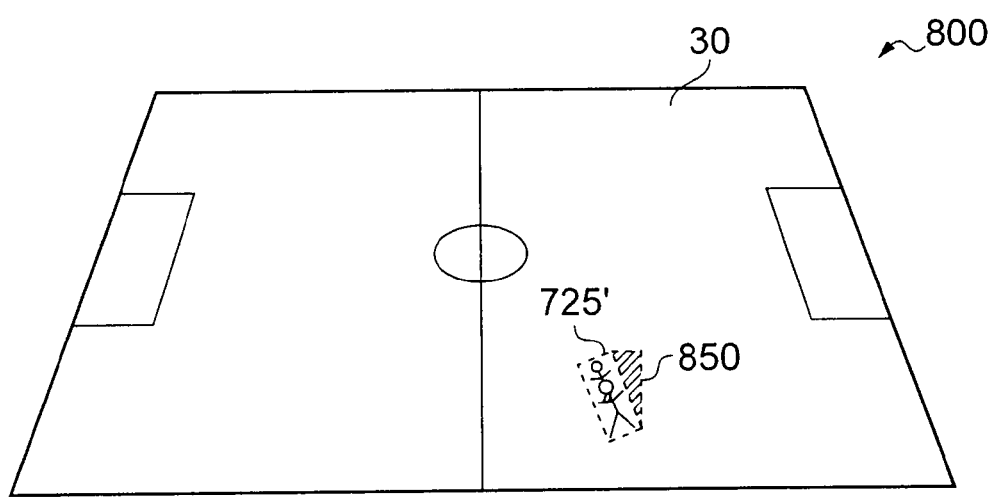

The third segment 725 is in the foreground of the image. This means that the transformed third segment 725' will expose part of the background previously not shown. This is highlighted in FIG. 8C as hatched area 850. In order to fill in the exposed background, the background pixels that have been exposed by transforming the third segment 725' are retrieved from the stored background image. The exposed background is corrected using the corresponding pixels from the stored background image.

It is advantageous to transform the third segment 725' and the foreground objects contained therein relative to the background objects. This is because if only the first player 705 or the second player 710 were transformed individually, then it would not be possible to fill in area exposed by the transforming of the player. This is because if the second player 710 were transformed then this would expose part of the first player 705. However, there would be no image data for the exposed part of the first player 705 and so it would not be possible to correctly fill the exposed part of the first player 705. However, as there is a background image stored, if all the foreground objects are moved to expose just a background image, the background can be correctly filled in.

As already noted, in embodiments a horizontal shear, which is one form of transformation, is applied to the pixels in the third segment 725 of FIG. 8B. The amount of transformation to be applied in general is a proportion of the transformation applied to the pitch at that particular vertical pixel position. Specifically, in embodiments the amount of shear to be applied is provided by equation 2 below.

$$shear = pitchshear * \left(1 - \frac{thresholdheight}{segmentverticalheight}\right) \quad \text{Equation 2}$$

Where shear is the shear to be applied; pitchshear is the shear applied to the pitch at that vertical pixel position; thresholdheight is the selected threshold height for that vertical pixel position and the segmentverticalheight is the vertical height of the segment.

In embodiments, the amount of shear or transformation applied is limited to a value between 0 and 1. In other words, the amount of shear or transformation will vary between no transformation and the same transformation as applied to the pitch. After the transformation is applied to the third segment, the modified left image (forming the right hand image) is generated by the workstation 10. The position of the transformed third segment 725' (which determines the amount of displacement required for the modified left image), will be the same position as the second player 710. This is because the intersection of the second player with the pitch is the same as in the non-modified image as a horizontal shear is applied.

Figure 8D:
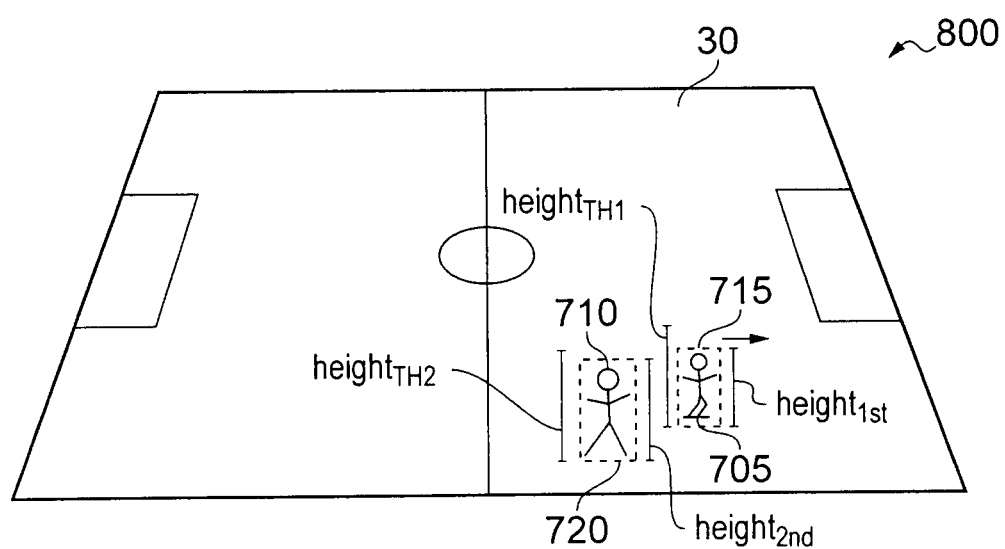

Referring to FIG. 8D, the first player 705 has run beyond the second player 710. This means that the vertical height of neither the detected first segment 715 nor the detected second segment 720 exceeds the vertical threshold height for the position of the respective detected segment. Accordingly, no transformation is applied to the detected segments.

Although the foregoing explains the transformation being applied to the occluded object, the invention is not so limited. Indeed, as will be explained, it may be advantageous to apply a transformation to one or both of the foreground objects before they occlude. In other words, it may be advantageous to apply a transformation to the first and/or the second player (s) before player 705 runs behind player 710 as in FIG. 8A. Similarly, it may be advantageous to apply a transformation to the first and/or the second player(s) after player 705 runs behind player 710 in FIG. 8D. This is explained with reference to FIGS. 9A and 9B where like reference numerals refer to like features.

Figure 9A:
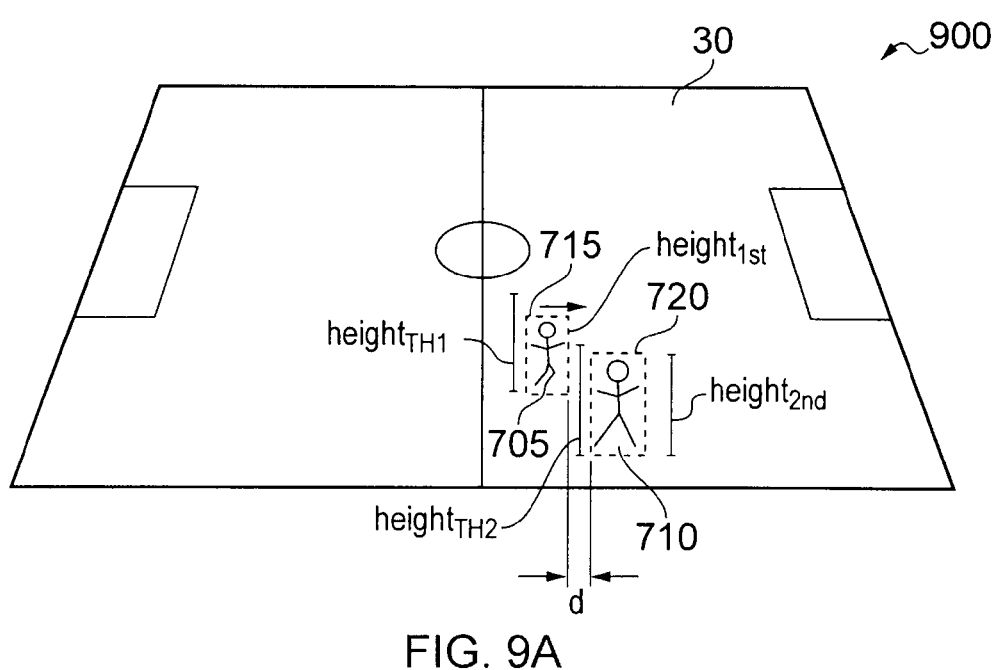
FIGS. 9a and 9b shows a representative image showing segmenting of players with correction applied according to a different embodiment of the present invention.

In FIG. 9A, the first player 705 and the second player 710 are located on a pitch 30 and form image 900. As in FIG. 8A, there is a first segment 715 around the first player 705 and a second segment 720 around the second player 710. As can be seen the distance between the first segment 715 and the second segment 720 is a distance d. This distance may be any value but is, in embodiments, 64 pixels within the image 900. This distance d is a maximum distance between the first segment 715 and the second segment 720 without a transformation being applied to the first player 705 and/or second player 710. In other words, the distance d sets a threshold value below which a transformation (or shear as defined above) is applied to the first and/or second player.

Figure 9B:
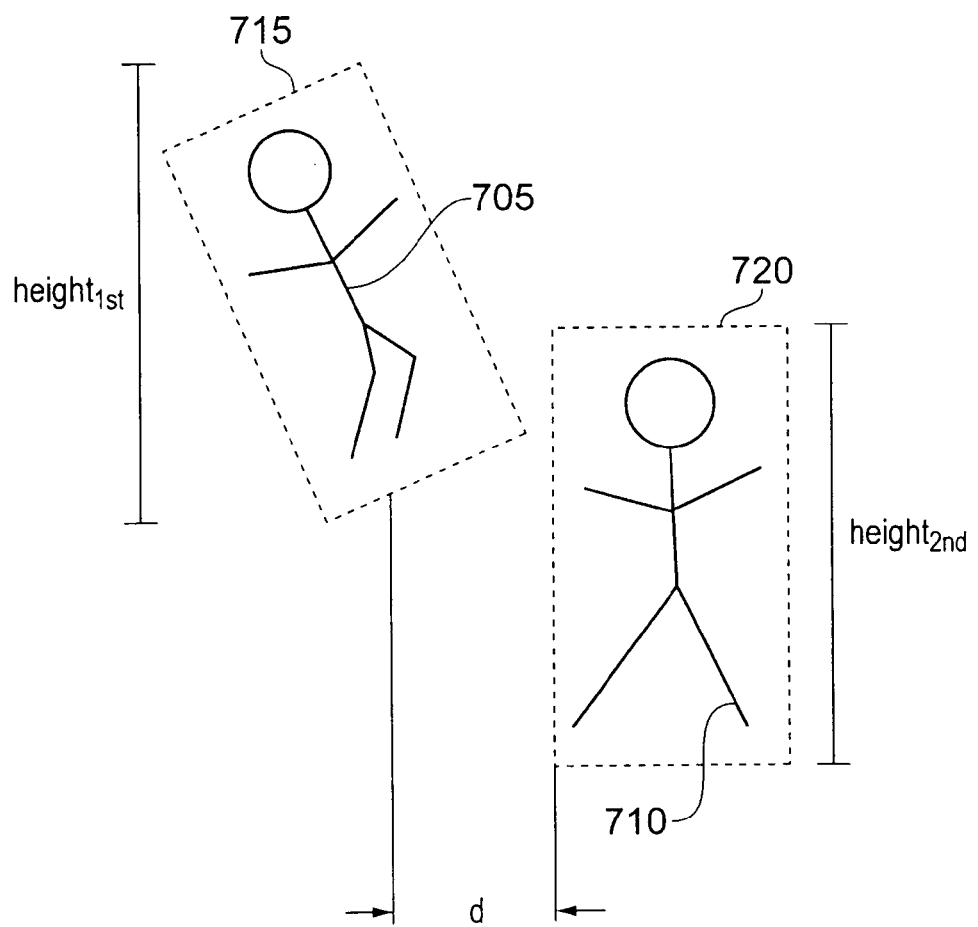
Figure 10:
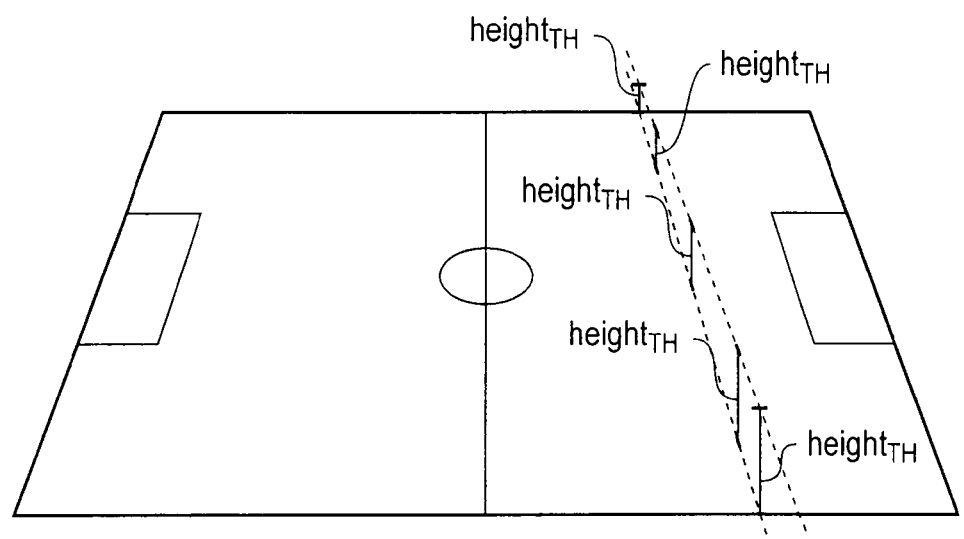
FIG. 10 shows a representative image of the scaling of the threshold height.

In FIG. 9B, the situation as the first player 705 runs closer to the second player 710 is shown. More specifically, the situation where the distance between the first segment 715 and the second segment 720 is less than distance d. As can be seen in this scenario, a shear is applied to the first player 705 only. However, it should be noted here that a shear may be applied to the second player 710 either in addition to the shear applied to the first player 705 or instead of the shear being applied to the second player 710. In fact, in some other embodiments, a shear is applied to both the first player and the second player.

In embodiments, the amount of shear applied to one or both of the first player 705 and the second player 710 is increased in proportion to the reduction in distance between the two segments with a maximum shear being applied when the first and second players are occluded. In other words, the amount of shear increases in an inverse proportional relationship with the distance d between the first segment 715 and the second segment 720 with a maximum shear being defined when the first and second players are occluded.

Therefore, with the maximum shear being defined by equation 2, it can be seen that the amount of shear to be applied to either one or both of the first and second player is defined as $$shearplayer = \left(1 - \frac{x}{d}\right)\left(pitchshear * \left(1 - \frac{thresholdheight}{segmentverticalheight}\right)\right) \quad \text{Equation 3}$$

Where shearplayer is the shear to be applied; x is the distance between the first and second segment; d is the threshold (maximum) distance between the first and second segment without shear being applied, pitchshear is the shear applied to the pitch at that vertical pixel position; thresholdheight is the selected threshold height for that vertical pixel position and the segmentverticalheight is the vertical height of the segment.

When the distance between the first segment 715 and the second segment 720 is zero (i.e. x=zero), the first and second players are occluded. Thus the shear applied to the occluded combination of the first player 705 and the second player 710 as defined in equation 2 above is applied to the occluded combination of the first and second objects. The method by which occlusion is established is the same as described with reference to FIGS. 8A to 8D and so will not be described hereinafter for brevity.

As will be appreciated, after the first player 705 has passed behind the second player 710, the occluded object will become the first and second segment again. In this case, the distance between the first segment and the second segment will gradually get larger as the first player 705 continues to run away from the second player 710. Accordingly, the shear applied to either or both the first player and the second player decreases until, at the point where the distance between the first segment 715 and the second segment 720 is d, no shear is applied to either or both of the first and second player. Accordingly, as the shear applied to first and/or second player gradually increases as the players become closer, the effect of the quick change explained above with reference to FIG. 7 is significantly reduced.

In order to reduce the amount of processing required in the system, as the players become closer, the head co-ordinates of player 710 are raised and the feet co-ordinates of player 705 are lowered. Therefore, when the first and second player become occluded the head position of the first player 705 and the foot position of the second player 710 is defined. In other words, rather than treat the two separate players independently to one another, the first and second players are instead treated as one very large player. This reduces the amount of processing required within the system, and also reduces the amount of sharp transition between the two objects.

As noted earlier, the maximum threshold height varies depending where on the pitch the detected segment is located. Specifically, the maximum threshold height varies depending on the distance between the detected segment and the camera. This variation in maximum vertical heights is illustrated in FIG. 9, where a number of maximum threshold heights (or vertical pixel counts) are shown for different locations on the pitch. The maximum threshold height will be the same at any pixel position in the horizontal direction of the image. However, as noted earlier, the farther an object is away from the camera, the smaller the object will look. The workstation 10 scales the maximum threshold height and generates a table identifying the maximum threshold height at an appropriate distance from the camera. Therefore, the workstation 10 simply has to look-up the pre-calculated maximum threshold height at any particular position. This improves the speed at which the maximum threshold height is obtained. Alternatively, it is possible to calculate the degree of scaling "on-the-fly" to save storage space.

It should be noted that the above occlusion detection has been described by comparing the height of the detected object with a threshold height. However, the invention is not so limited. For example, the width of the detected object may be compared with a threshold width. Moreover, other methods of occlusion detection are envisaged such as detecting, and counting the number of heads, or limbs in the object. If the detected object is a soccer player, then should the workstation 10 detect two or more heads, or 8 or more limbs in the detected object then the workstation 10 will appreciate that the detected object is an occluded object. Additionally, although the above mentions the vertical height being used to detect the occluded object, other dimensions such as width of the object could alternatively be used.

Although the above embodiments have been described above with reference to players of a sports game, it will be appreciated that the above described techniques may be applied to other situations where it is desirable to capture and produce 3D images.

Furthermore, it will be appreciated that although the above described embodiments have been described as carrying out image processing on one image, it will be appreciated that the above techniques may be applied to images in a sequence of video images captured by a video camera. By displacing the position of an object within a modified image with respect to a detected position of the object within captured image by an offset amount which is dependent upon a distance determined by the workstation from data such as image data or distance data, 3D images can be captured and generated so that they can be viewed by a user substantially in real time.

In the above described embodiments, image processing has been described as being carried out on an image captured by the camera 20. However, it will be appreciated that the above described techniques are equally applicable to video images which have been stitched together, for example so as to form an ultra-high resolution images such as ones generated by stitching together video images captured by cameras 22.1 and 22.2. Additionally, it will be appreciated that the captured image could be treated as the right-hand image and the modified image as the left-hand image.

It will be appreciated that in order to achieve a three-dimensional appearance for a user, the left-hand image (L) and the right-hand image (R) do not need to be displayed simultaneously on a display. For example, they can be displayed alternately at a rate which corresponds to a frame rate for each image which is faster than a user's persistent vision (typically 24 frames per second). In other words a sequence of frames comprising alternate left-hand and right-hand images (e.g. LRLRLRLRLR) could be displayed at a frame rate of 60 frames per second (i.e. 30 frames per second for each image), although any other suitable frame rate could be used. The user can then view the images using an appropriate pair of glasses which alternately blank the corresponding left image or right image so that the correct image is viewed by the correct eye. Therefore, the term "viewed together" should be understood as meaning that the left-hand image and right-hand image can be viewed simultaneously, that they can be viewed alternately, or that they can be viewed in any other suitable way such that a user perceives a three-dimensional effect.

It will be appreciated that in embodiments of the present invention, elements of the image processing method may be implemented in the content processing workstation in any suitable manner. Thus the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of generating a three dimensional image from a two dimensional image, the two dimensional image having a background and a first foreground object and a second foreground object located thereon, the method comprising the steps of:

applying a transformation to a copy of the background;

generating stereoscopically for display the background and the transformed background;

determining whether the first and second foreground objects occlude with one another, wherein in the event of occlusion, the occluded combination of the first and second object forms a third foreground object in the two dimensional image, and the method further comprises the step of:

applying a transformation to the third foreground object, wherein the transformation applied to the third foreground object is less than or equal to the transformation applied to the background;

generating a copy of the third foreground object with the transformation applied thereto; and generating stereoscopically for display the third foreground object with the transform applied thereto and the copy of the third foreground object displaced relative to one another by an amount determined in accordance with the position of one of the first or second foreground objects in the image.

2. The method according to claim 1, wherein the step of determining whether occlusion has occurred comprises determining whether the third foreground object has been formed by comparing a length of a detected foreground object in one direction of the image with a threshold length, and determining that the detected foreground object is the third foreground object, and thus that occlusion has occurred, when the length of the detected foreground object is longer than the threshold length.

3. The method according to claim 1, wherein the step of determining whether occlusion has occurred comprises determining whether the third foreground object has been formed by comparing a height of a detected foreground object in the vertical direction of the image with a threshold height, and determining that the detected foreground object is the third foreground object, and thus that occlusion has occurred, when the height of the detected foreground object is taller than the threshold height.

4. The method according to claim 2, wherein the degree of transformation applied to the third foreground object is determined in accordance with the difference between the length of the third foreground object and the threshold length.

5. The method according to claim 1, comprising storing a copy of the background of the image, and in the event of applying a transformation to the third foreground object, the method further comprises the step of mapping pixels from the background version of the image to corresponding pixel positions vacated by the transformed third foreground object.

6. A method of generating a three dimensional image from a two dimensional image, the two dimensional image having a background and a first foreground object and a second foreground object located thereon, the method comprising the steps of:

applying a transformation to a copy of the background;

generating stereoscopically for display the background and the transformed background;

detecting the first and second foreground object located in the two dimensional image;

determining whether the first and second foreground objects are within a predetermined distance of one another, wherein in the event of the first and second foreground objects being within a predetermined distance of one another, the method further comprises the step of:

applying a transformation to the first foreground object, wherein the transformation applied to the first foreground object is less than or equal to the transformation applied to the background;

generating a copy of the first foreground object with the transformation applied thereto; and generating stereoscopically for display the first foreground object with the transform applied thereto and the copy of the first foreground object displaced relative to one another by an amount determined in accordance with the position of the first foreground object in the image.

7. The method according to claim 6, wherein the amount of transformation applied to the first foreground object increases inversely proportionally to the distance between the first and second foreground object.

8. A non-transitory computer-readable medium including a computer program containing computer readable instructions which, when loaded onto a computer, configure the computer to perform a method according to any one of claims 1 or 2.

9. An apparatus for generating a three dimensional image from a two dimensional image, the two dimensional image having a background and a first foreground object and a second foreground object located thereon, the apparatus comprising:

a generator for applying a transformation to a copy of the background;

a device for generating stereoscopically for display the background and the transformed background;

a determiner for determining whether the first foreground object and the second foreground object occlude with one another, wherein in the event of occlusion, the occluded combination of the first and second foreground object form a third foreground object in the two dimensional image, and the apparatus is operable to apply a transformation to the third foreground object wherein the transform applied to the third foreground object is less than or equal to the transform applied to the background;

the generator being further operable to generate a copy of the third foreground object with the transform applied thereto and a device being operable to generate stereoscopically for display the third foreground object with the transform applied thereto and the copy of the third foreground object displaced relative to one another by an amount determined in accordance with the position of one of the first or second foreground object in the image.

10. The apparatus according to claim 9, wherein the determiner is further operable to determine whether the third foreground object has been formed by comprising a length of a detected foreground object in one direction of the image with a threshold length, and to determine that the detected foreground object is the third foreground object, and thus that occlusion has occurred, when the length of the detected foreground object is longer than the threshold length.

11. The apparatus according to claim 9, wherein the determiner is operable to determine whether the third foreground object has been formed by comprising a height of a detected foreground object in the vertical direction of the image with a threshold height, and to determine that the detected foreground object is the third foreground object, and thus that occlusion has occurred, when the height of the detected foreground object is taller than the threshold height.

12. The apparatus according to claim 10, wherein the degree of transformation applied to the third foreground object is determined in accordance with the difference between the length of the third foreground object and the threshold length.

13. The apparatus according to claim 9, comprising a store operable to store a copy of the background image, and in the event of applying a transform to the third foreground object, a mapping device is further operable to map pixels from the background version of the image to corresponding pixel positions vacated by the transformed third foreground object.

14. An apparatus for generating a three dimensional image from a two dimensional image, the two dimensional image having a background and a first foreground object and a second foreground object located thereon, the apparatus comprising:
- a transformer operable to apply a transformation to a copy of the background;
- a generator operable to generate stereoscopically for display the background and the transformed background;
- a detector capable to detect the first and second foreground object located in the two dimensional image; and
- a determiner operable to determine whether the first and second foreground objects are within a predetermined distance of one another, wherein in the event of the first and second foreground object being within a predetermined distance of one another;
- an applier is operable to apply a transformation to the first foreground object, wherein the transformation applied to the first foreground object is less than or equal to the transformation applied to the background;
- a copy generator operable to generate a copy of the first foreground object with the transformation applied thereto and to generate stereoscopically for display the first foreground object with the transform applied thereto and the copy of the first foreground object being displaced relative to one another by an amount determined in accordance with the position of the first foreground object in the image.

15. The apparatus according to claim 14 wherein the amount of transformation applied to the first foreground object increases inversely proportionally to the distance between the first and second foreground object.

* * * * *